(12) United States Patent
Han

(10) Patent No.: US 9,143,263 B2
(45) Date of Patent: Sep. 22, 2015

(54) METHOD AND SYSTEM FOR MONITORING PERFORMANCE OF WAVELENGTH PATH, AND NODE DEVICE

(71) Applicant: Huawei Technologies Co., Ltd., Shenzhen (CN)

(72) Inventor: Jianrui Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/036,972

(22) Filed: Sep. 25, 2013

(65) Prior Publication Data

US 2014/0023361 A1    Jan. 23, 2014

Related U.S. Application Data

(63) Continuation of application No. PCT/CN2012/071459, filed on Feb. 22, 2012.

(51) Int. Cl.
*H04J 14/02* (2006.01)
*H04B 10/079* (2013.01)

(52) U.S. Cl.
CPC ........ *H04J 14/0227* (2013.01); *H04B 10/0795* (2013.01); *H04J 14/0221* (2013.01); *H04J 14/0258* (2013.01); *H04J 14/0276* (2013.01)

(58) Field of Classification Search
CPC .......... H04J 14/0227–14/0228; H04J 14/0258; H04J 14/0264–14/0267; H04J 14/0269
See application file for complete search history.

(56) References Cited

U.S. PATENT DOCUMENTS 7,024,113 B2 * 4/2006 Miyabe ........................ 398/51
7,529,480 B2   5/2009 Seddigh et al.
2001/0012141 A1 8/2001 Takai et al.
(Continued)

FOREIGN PATENT DOCUMENTS

CN    1384618 A    12/2002
CN    101192968 A   6/2008
(Continued)

OTHER PUBLICATIONS

Martinielli, G. et al., "GMPLS Signaling Extensions for Optical Impairment Aware Lightpath Setup," Internet Engineering Task Force, 2008, 20 pages.

*Primary Examiner* — David Payne
*Assistant Examiner* — Casey Kretzer
(74) *Attorney, Agent, or Firm* — Brinks Gilson & Lione

(57) ABSTRACT

The present disclosure relates to the field of network communication and particularly discloses a method for monitoring performance of a wavelength path. The method includes: receiving, by a second node, a path request message of a wavelength path from an upstream neighboring node, where the path request message includes at least a path identifier of the wavelength path and second wavelength identifier information; obtaining, by the second node, a wavelength identifier according to the second wavelength identifier information, and recording a mapping relationship between the wavelength path and the wavelength identifier; and determining, by the second node according to the wavelength identifier, a low frequency signal modulated at a working wavelength of the wavelength path, and obtaining performance of the wavelength path by monitoring the low frequency signal. A system for monitoring performance of a wavelength path and a node device are also disclosed in embodiments of the present disclosure.

5 Claims, 6 Drawing Sheets

(56) References Cited

U.S. PATENT DOCUMENTS

| | | |
|---|---|---|
| 2003/0099010 A1 | 5/2003 | Liu et al. |
| 2004/0062548 A1 | 4/2004 | Obeda et al. |
| 2004/0249976 A1 | 12/2004 | Neustadter et al. |
| 2006/0291860 A1* | 12/2006 | Carpini et al. ............... 398/59 |
| 2008/0298805 A1* | 12/2008 | Lee et al. .................... 398/48 |
| 2009/0263125 A1 | 10/2009 | Shen et al. |
| 2011/0081148 A1 | 4/2011 | Lee et al. |
| 2011/0200327 A1* | 8/2011 | Qi et al. ..................... 398/34 |

FOREIGN PATENT DOCUMENTS

| | | |
|---|---|---|
| CN | 101330485 A | 12/2008 |
| CN | 101453266 A | 6/2009 |
| CN | 101729185 A | 6/2010 |
| CN | 102195739 A | 9/2011 |
| WO | WO 02/073854 A1 | 9/2002 |
| WO | WO-2010/045866 A1 * | 4/2010 |

* cited by examiner

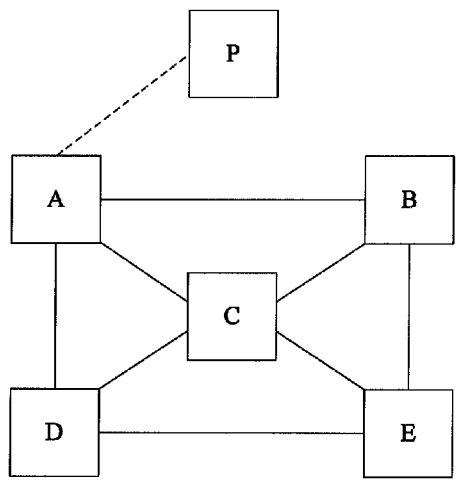
FIG. 2
```
0                   1                   2                   3
0 1 2 3 4 5 6 7 8 9 0 1 2 3 4 5 6 7 8 9 0 1 2 3 4 5 6 7 8 9 0 1
```
| Wavelength identifier information |
|---|
FIG. 3a
```
0                   1                   2                   3
0 1 2 3 4 5 6 7 8 9 0 1 2 3 4 5 6 7 8 9 0 1 2 3 4 5 6 7 8 9 0 1
```
| Frequency information | Binary code information |
|---|---|
FIG. 3b
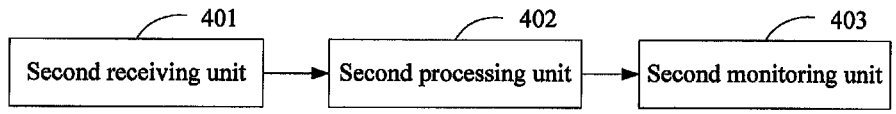
FIG. 4a

METHOD AND SYSTEM FOR MONITORING PERFORMANCE OF WAVELENGTH PATH, AND NODE DEVICE

CROSS-REFERENCE TO RELATED APPLICATIONS

This application is a continuation of International Application No. PCT/CN2012/071459, filed on Feb. 22, 2012, which is hereby incorporated by reference in its entirety.

FIELD

The present disclosure relates to network communication technologies, and in particular, to a method and system for monitoring performance of a wavelength path, and a node device.

BACKGROUND

A WDM (Wavelength Division Multiplexing, wavelength division multiplexing) technology is a mainstream technology in the current optical transmission field, and can transmit optical waves of multiple different wavelengths in a single fiber synchronously. The wavelength path performs transmission on the network in an all-optical state, and intermediate nodes cannot obtain, like an SDH (Synchronous Digital Hierarchy, synchronous digital hierarchy) network, path information by extracting path overheads. Therefore, the wavelength path cannot be managed and maintained by using the path overheads.

In this case, a wavelength tracking technology emerges in the industry, that is, in each wavelength path, a low frequency signal is modulated by using a certain modulation scheme; after multiple wavelength paths are multiplexed, signals are transmitted through the main optical path. The frequency value of the low frequency signal and a binary code representing the modulation scheme form the wavelength identifier of the wavelength path. A node in the wavelength path splits a part of light from the main optical path, obtains, through demodulation, multiple low frequency signals added to multiple wavelength paths, determines, according to the wavelength identifier, a low frequency signal modulated in the wavelength path, and monitors the low frequency signal to obtain the transmission track and performance of a corresponding wavelength path. In this way, the management and maintenance of the wavelength path are implemented.

Currently, in this method, the performance of the wavelength path can be monitored only when a wavelength identifier is allocated to each wavelength path manually by using a network management system and a mapping relationship between the wavelength identifier and the wavelength path is configured into each node manfully by using the network management system. Therefore, the implementation is complex, and the reliability is low.

SUMMARY

Embodiments of the present disclosure provide a method and system for monitoring performance of a wavelength path, and a node device to solve problems of complex implementation and low reliability caused by manual configurations.

The embodiments of the present disclosure adopt the following technical solutions:

In one aspect, the present disclosure provides a method for monitoring performance of a wavelength path, including: receiving, by a second node, a path request message of a wavelength path from an upstream neighboring node, where the path request message includes at least a path identifier of the wavelength path and second wavelength identifier information; obtaining, by the second node, a wavelength identifier according to the second wavelength identifier information, and recording a mapping relationship between the wavelength path and the wavelength identifier; and determining, by the second node according to the wavelength identifier, a low frequency signal modulated at a working wavelength of the wavelength path, and obtaining performance of the wavelength path by monitoring the low frequency signal.

The second wavelength identifier information is information constructed according to the wavelength identifier and included in the path request message of the wavelength path sent to a downstream neighboring node by a first node after recording the mapping relationship between the wavelength path and the wavelength identifier. The wavelength identifier is obtained by the first node according to first wavelength identifier information in a control reply message sent from a centralized control node; the wavelength identifier is indicated by a frequency value of the low frequency signal and a binary code representing a modulation scheme and is used by the first node to determine the low frequency signal modulated at the working wavelength of the wavelength path and the modulation scheme and modulate the working wavelength of the wavelength path. The first wavelength identifier information is information constructed according to the wavelength identifier and included in the control reply message sent to the first node by the centralized control node after allocating, according to wavelength identifier allocation request information, the wavelength identifier that identifies the wavelength path. The wavelength identifier allocation request information is carried in a control request message received by the centralized control node from the first node.

In another aspect, the present disclosure provides a method for monitoring performance of a wavelength path, including: sending, by a first node, a control request message to a centralized control node, where the control request message includes at least wavelength identifier allocation request information; receiving, by the first node, a control reply message from the centralized control node, where the control reply message includes at least first wavelength identifier information constructed according to a wavelength identifier, where the wavelength identifier is indicated by a frequency value of a low frequency signal and a binary code representing a modulation scheme and is allocated by the centralized control node according to the wavelength identifier allocation request information in the received control request message and is used to identify a wavelength path; obtaining, by the first node, the wavelength identifier according to the first wavelength identifier information, and recording a mapping relationship between the wavelength path and the wavelength identifier; determining, by the first node according to the wavelength identifier, the low frequency signal modulated at a working wavelength of the wavelength path and the modulation scheme, and modulating the working wavelength of the wavelength path; and monitoring, by the first node, the low frequency signal to obtain performance of the wavelength path.

In still another aspect, the present disclosure provides a node device, including a second receiving unit, a second processing unit, and a second monitoring unit, where:

the second receiving unit is configured to receive a path request message of a wavelength path from an upstream neighboring node, where the path request message includes at least a path identifier of the wavelength path and second wavelength identifier information; the second wavelength identifier information is information constructed according to a wavelength identifier and included in the path request message of the wavelength path sent to a downstream neighboring node by a first node device after recording a mapping relationship between the wavelength path and the wavelength identifier; the wavelength identifier is obtained by the first node device according to first wavelength identifier information in a control reply message sent from a centralized control node; the wavelength identifier is indicated by a frequency value of a low frequency signal and a binary code representing a modulation scheme and is used by the first node device to determine the low frequency signal modulated at a working wavelength of the wavelength path and the modulation scheme and modulate the working wavelength of the wavelength path; the first wavelength identifier information is information constructed according to the wavelength identifier and included in the control reply message sent to the first node device by the centralized control node after allocating, according to wavelength identifier allocation request information, the wavelength identifier that identifies the wavelength path; and the wavelength identifier allocation request information is carried in a control request message received by the centralized control node from the first node device; the second processing unit is configured to obtain the wavelength identifier according to the second wavelength identifier information, and record the mapping relationship between the wavelength path and the wavelength identifier; and the second monitoring unit is configured to determine, according to the wavelength identifier, the low frequency signal modulated at the working wavelength of the wavelength path, and obtain performance of the wavelength path by monitoring the low frequency signal.

In still another aspect, the present disclosure provides a node device, including a first controlling unit, a first processing unit, a first modulating unit, and a first monitoring unit, where:

the first controlling unit is configured to: send a control request message to a centralized control node device, where the control request message includes at least wavelength identifier allocation request information; and receive a control reply message sent from the centralized control node device, where the control reply message includes at least first wavelength identifier information constructed according to a wavelength identifier, where the wavelength identifier is indicated by a frequency value of a low frequency signal and a binary code representing a modulation scheme and is allocated by the centralized control node device according to the wavelength identifier allocation request information in the received control request message and is used to identify a wavelength path;

the first processing unit is configured to obtain the wavelength identifier according to the first wavelength identifier information, and record a mapping relationship between the wavelength path and the wavelength identifier;

the first modulating unit is configured to determine, according to the wavelength identifier, the low frequency signal modulated at a working wavelength of the wavelength path and the modulation scheme, and modulate the working wavelength of the wavelength path; and the first monitoring unit is configured to monitor the low frequency signal to obtain performance of the wavelength path.

In still another aspect, the present disclosure provides a system for monitoring performance of a wavelength path, including at least a first node device, a second node device, and a centralized control node device, where:

the first node device is configured to: send a control request message to the centralized control node device, where the control request message includes at least wavelength identifier allocation request information; receive a control reply message from the centralized control node device, obtain a wavelength identifier according to first wavelength identifier information in the control reply message, and record a mapping relationship between a wavelength path and the wavelength identifier; determine, according to the wavelength identifier, a low frequency signal modulated at a working wavelength of the wavelength path and a modulation scheme, and modulate the working wavelength of the wavelength path; after recording the mapping relationship between the wavelength path and the wavelength identifier, send a path request message of the wavelength path to a downstream neighboring node device, where the path request message includes at least a path identifier of the wavelength path and second wavelength identifier information constructed according to the wavelength identifier;

the centralized control node device is configured to: receive the control request message, and allocate, according to the wavelength identifier allocation request information in the control request message, the wavelength identifier that identifies the wavelength path, where the wavelength identifier is indicated by a frequency value of the low frequency signal and a binary code representing the modulation scheme; send the control reply message to the first node device, where the control reply message includes at least the first wavelength identifier information constructed according to the wavelength identifier; and the second node device is configured to: receive a path request message of the wavelength path from an upstream neighboring node device, where the path request message includes at least the path identifier of the wavelength path and the second wavelength identifier information; obtain the wavelength identifier according to the second wavelength identifier information, and record the mapping relationship between the wavelength path and the wavelength identifier; and determine, according to the wavelength identifier, the low frequency signal modulated at the working wavelength of the wavelength path, and obtain performance of the wavelength path by monitoring the low frequency signal.

In still another aspect, the present disclosure provides a system for monitoring performance of a wavelength path, including at least a first node device and a centralized control node device, where:

the first node device is configured to: send a control request message to the centralized control node device, where the control request message includes at least wavelength identifier allocation request information; receive a control reply message from the centralized control node device, obtain a wavelength identifier according to first wavelength identifier information in the control reply message, and record a mapping relationship between a wavelength path and the wavelength identifier; determine, according to the wavelength identifier, a low frequency signal modulated at a working wavelength of the wavelength path and a modulation scheme, and modulate the working wavelength of the wavelength path; and obtain performance of the wavelength path by monitoring the low frequency signal; and the centralized control node device is configured to: receive the control request message, and allocate, according to the wavelength identifier allocation request information in the control request message, the wavelength identifier that identifies the wavelength path, where the wavelength identifier is indicated by a frequency value of the low frequency signal and a binary code representing the modulation scheme;

send the control reply message to the first node device, where the control reply message includes at least the first wavelength identifier information constructed according to the wavelength identifier.

By using the method and system for monitoring performance of a wavelength path, and node device according to embodiments of the present disclosure, the centralized control node allocates a wavelength identifier to a wavelength path automatically; and wavelength identifier information of the wavelength path is carried in a path request message of the wavelength path. In this way, nodes in the wavelength path obtain the wavelength identifier automatically and monitor the performance of the wavelength path, thereby featuring simple implementation and high reliability.

BRIEF DESCRIPTION OF THE DRAWINGS

To illustrate the technical solutions in the embodiments of the present disclosure more clearly, the following briefly describes the accompanying drawings required for describing the embodiments of the present disclosure. Apparently, the accompanying drawings in the following description merely show some embodiments of the present disclosure, and persons of ordinary skill in the art can derive other drawings from these accompanying drawings without creative efforts.

FIG. 2 is a schematic topological diagram of a wavelength division network according to an embodiment of the present disclosure;

FIG. 3a illustrates an encapsulation format of a payload of a wavelength identifier object according to an embodiment of the present disclosure;

FIG. 3b illustrates a specific encapsulation format of a payload of a wavelength identifier object according to an embodiment of the present disclosure;

FIG. 4a is a structural block diagram of a node device according to an embodiment of the present disclosure;

DETAILED DESCRIPTION OF THE EMBODIMENTS

Embodiments of the present disclosure provide a method and system for monitoring performance of a wavelength path, and a node device. For better understanding of the technical solutions of the present disclosure, the following describes the embodiments of the present disclosure with reference to the accompanying drawings.

It should be definite that, the described embodiments are only a part of the embodiments of the present disclosure rather than all the embodiments. All other embodiments obtained by persons of ordinary skill in the art based on the embodiments of the present disclosure without creative efforts shall fall within the protection scope of the present disclosure.

Figure 1A:
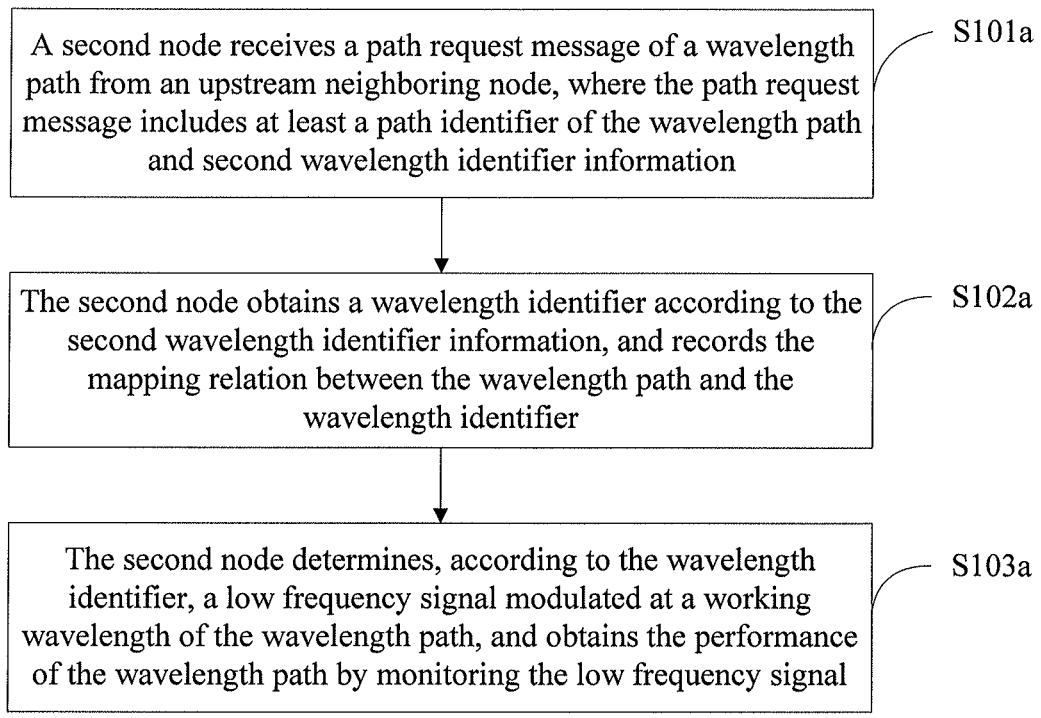
FIG. 1a is a flowchart of a method for monitoring performance of a wavelength path according to an embodiment of the present disclosure.

FIG. 1a is a flowchart of a method for monitoring performance of a wavelength path according to an embodiment of the present disclosure. The method includes the following steps:

Step S101a: A second node receives a path request message of a wavelength path from an upstream neighboring node, where the path request message includes at least a path identifier of the wavelength path and second wavelength identifier information.

The second wavelength identifier information is information constructed according to a wavelength identifier and included in a path request message of the wavelength path sent to a downstream neighboring node by a first node after recording a mapping relationship between the wavelength path and the wavelength identifier; the wavelength identifier is obtained by the first node device according to first wavelength identifier information in a control reply message sent from a centralized control node; the wavelength identifier is indicated by a frequency value of a low frequency signal and a binary code representing a modulation scheme and is used by the first node to determine the low frequency signal modulated at a working wavelength of the wavelength path and the modulation scheme and modulate the working wavelength of the wavelength path; the first wavelength identifier information is information constructed according to the wavelength identifier and included in the control reply message sent to the first node device by the centralized control node after allocating, according to wavelength identifier allocation request information, the wavelength identifier that identifies the wavelength path; and the wavelength identifier allocation request information is carried in a control request message received by the centralized control node from the first node.

Step S102a: The second node obtains the wavelength identifier according to the second wavelength identifier information, and records the mapping relationship between the wavelength path and the wavelength identifier.

Step S103a: The second node determines, according to the wavelength identifier, the low frequency signal modulated at the working wavelength of the wavelength path, and obtains the performance of the wavelength path by monitoring the low frequency signal.

Further, step S104a may be included, that is, after receiving the path request message of the wavelength path from the upstream neighboring node, the second node sends a path request message of the wavelength path to a downstream neighboring node, where the path request message includes at least the path identifier of the wavelength path and the second wavelength identifier information.

The second wavelength identifier information is used by the downstream neighboring node to obtain the wavelength identifier, record the mapping relationship between the wavelength path and the wavelength identifier, determine, according to the wavelength identifier, the low frequency signal modulated at the working wavelength of the wavelength path, and obtain the performance of the wavelength path by monitoring the low frequency signal.

Figure 1B:
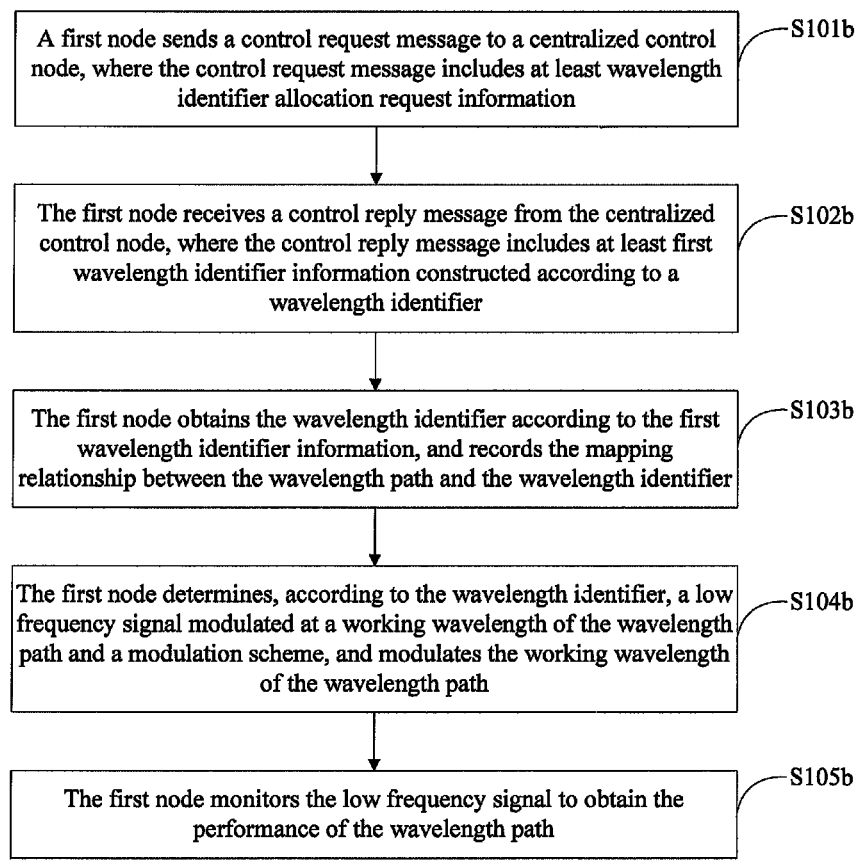
FIG. 1b is a flowchart of a method for monitoring performance of a wavelength path according to another embodiment of the present disclosure.

FIG. 1b is a flowchart of a method for monitoring performance of a wavelength path according to another embodiment of the present disclosure. The method includes the following steps:

Step S101b: A first node sends a control request message to a centralized control node, where the control request message includes at least wavelength identifier allocation request information.

Step S102b: The first node receives a control reply message from the centralized control node, where the control reply message includes at least first wavelength identifier information constructed according to a wavelength identifier, where the wavelength identifier is indicated by a frequency value of a low frequency signal and a binary code representing a modulation scheme and is allocated by the centralized control node according to the wavelength identifier allocation request information in the received control request message and is used to identify a wavelength path.

Step S103b: The first node obtains the wavelength identifier according to the first wavelength identifier information, and records the mapping relationship between the wavelength path and the wavelength identifier.

Step S104b: The first node determines, according to the wavelength identifier, the low frequency signal modulated at a working wavelength of the wavelength path and the modulation scheme, and modulates the working wavelength of the wavelength path.

Step S105b: The first node monitors the low frequency signal to obtain the performance of the wavelength path.

Further, step S106b may be included, that is, after recording the mapping relationship between the wavelength path and the wavelength identifier, the first node sends a path request message of the wavelength path to a downstream neighboring node, where the path request message includes at least a path identifier of the wavelength path and second wavelength identifier information constructed according to the wavelength identifier.

The second wavelength identifier information is used by the downstream neighboring node to obtain the wavelength identifier, record the mapping relation between the wavelength path and the wavelength identifier, determine, according to the wavelength identifier, the low frequency signal modulated at the working wavelength of the wavelength path, and obtain the performance of the wavelength path by monitoring the low frequency signal.

The following describes in detail a method and system for monitoring performance of a wavelength path, and a node device according to embodiments of the present disclosure with reference to the accompanying drawings.

It should be definite that, the described embodiments are only a part of the embodiments of the present disclosure rather than all the embodiments. All other embodiments obtained by persons of ordinary skill in the art based on the embodiments of the present disclosure without creative efforts shall fall within the protection scope of the present disclosure.

Embodiment 1: An embodiment of the present disclosure provides a method for monitoring performance of a wavelength path. On the network shown in FIG. 2, black solid lines between nodes A, B, C, D, and E indicate optical links, and a node P refers to a centralized control node. An established wavelength path Path1 exists between the node A and the node B. The working wavelength of the Path1 is $\lambda 1$ and the route is A-D-C-B. The performance of the wavelength path Path1 needs to be monitored. The node A is the source node of a signaling message, and the node B is the destination node of the signaling message. The downstream refers to a direction from the source node A to the destination node B, and the upstream refers to a direction from the destination node B to the source node A. The method specifically includes the following steps:

Step S201: The node A sends a control request message to the centralized control node P, where the control request message includes at least wavelength identifier allocation request information.

In this embodiment, to ensure that the performance of the wavelength path Path1 can be monitored, the node A sends a control request message to the centralized control node P, requesting to allocate a wavelength identifier to the wavelength path Path1, where the control request message includes at least the wavelength identifier allocation request information.

Step S202: The centralized control node P receives the control request message from the node A, and allocates, according to the wavelength identifier allocation request information in the control request message, a wavelength identifier Wavekey that identifies the wavelength path Path1.

The centralized control node may allocate the wavelength identifier by using the following two modes. The specific allocation mode may be pre-configured.

Mode 1: Allocating a wavelength identifier to each wavelength path. In this allocation mode, the wavelength identifier corresponds to the wavelength path on a one-to-one basis.

Mode 2: Allocating a wavelength identifier to each wavelength, that is, the center frequency of one wavelength corresponds to one wavelength identifier. In this allocation mode, multiple wavelength paths may be allocated a same wavelength identifier, and the wavelength identifier plus the information of the source node and destination node of the wavelength path corresponds to the wavelength path on a one-to-one basis.

At the physical layer, in each wavelength path, a low frequency signal is modulated by using a certain modulation scheme, and the low frequency signal is transmitted along the wavelength path. Therefore, the performance of the low frequency signal reflects the performance of a corresponding wavelength path. Accordingly, the wavelength identifier of each wavelength path may be represented by a frequency value of the low frequency signal and a binary code representing the modulation scheme.

In this embodiment, the centralized control node P receives a control request message from the node A, where the control request message includes wavelength identifier allocation request information, and allocates, according to a pre-configured allocation mode 1, a wavelength identifier Wavekey that identifies the wavelength path Path1. The centralized control node P records that the wavelength identifier Wavekey is already allocated to ensure that on the network the wavelength identifier Wavekey corresponds to the wavelength path Path1 on a one-to-one basis.

Step S203: The centralized control node P sends a control reply message to the node A, where the control reply message includes at least first wavelength identifier information WK1 constructed according to the wavelength identifier Wavekey.

In this embodiment, the centralized control node P constructs, by using the wavelength identifier Wavekey, the first wavelength identifier information WK1 according to the format of the control reply message, and sends the control reply message to the node A, where the control reply message includes at least the first wavelength identifier information WK1 constructed according to the wavelength identifier Wavekey.

Step S204: The node A receives the control reply message from the centralized control node P, obtains the wavelength identifier Wavekey according to the first wavelength identifier information WK1 in the control reply message, and records the mapping relationship between the wavelength path Path1 and the wavelength identifier Wavekey.

Step S205: The node A sends a path request message of the wavelength path Path1 to the downstream neighboring node D, where the path request message includes at least the path identifier of the wavelength path Path1 and second wavelength identifier information WK2 constructed according to the wavelength identifier Wavekey.

In this embodiment, the node A sends, according to the second wavelength identifier information WK2 constructed according to the wavelength identifier Wavekey, a path request message of the wavelength path Path1 to the node D, where the path request message includes at least the Path ID (Path Identifier, path identifier) of the wavelength path Path1 and the second wavelength identifier information WK2 constructed according to the wavelength identifier Wavekey.

Step S206: The node D receives the path request message, obtains the wavelength identifier Wavekey according to the second wavelength identifier information WK2 in the path request message, and records the mapping relationship between the wavelength path Path1 and the wavelength identifier Wavekey; and sends a path request message of the wavelength path Path1 to the downstream neighboring node C, where the path request message includes at least the path identifier of the wavelength path Path1 and the second wavelength identifier information WK2.

In this embodiment, the node D receives a path request message, obtains the wavelength identifier Wavekey according to the second wavelength identifier information WK2 in the path request message, obtains the mapping relationship between the wavelength path Path1 and the wavelength identifier Wavekey according to the path identifier of the wavelength path Path1, and records the mapping relationship between the wavelength path Path1 and the wavelength identifier Wavekey; and sends a path request message of the wavelength path Path1 to the downstream neighboring node C, where the path request message includes at least the path identifier of the wavelength path Path1 and the second wavelength identifier information WK2.

The step of "sending a path request message of the wavelength path Path1 to the downstream neighboring node C" may be executed before or after the step of "obtaining the wavelength identifier Wavekey according to the wavelength identifier information in the path request message and recording the mapping relationship between the wavelength path Path1 and the wavelength identifier Wavekey", and both the steps are executed after the step of "receiving the path request message."

Step S207: The node C receives the path request message, obtains the wavelength identifier Wavekey according to the second wavelength identifier information WK2 in the path request message, and records the mapping relationship between the wavelength path Path1 and the wavelength identifier Wavekey; and sends a path request message of the wavelength path Path1 to the downstream neighboring node B, where the path request message includes at least the path identifier of the wavelength path Path1 and the second wavelength identifier information WK2.

In this embodiment, the step of "sending a path request message of the wavelength path Path1 to the downstream neighboring node B" may be executed before or after the step of "obtaining the wavelength identifier Wavekey according to the wavelength identifier information in the path request message and recording the mapping relationship between the wavelength path Path1 and the wavelength identifier Wavekey", and both the steps are executed after the step of "receiving the path request message."

Step S208: The node B receives the path request message, obtains the wavelength identifier Wavekey according to the second wavelength identifier information WK2 in the path request message, and records the mapping relationship between the wavelength path Path1 and the wavelength identifier Wavekey.

Step S209: One or more nodes in the wavelength path Path1 determine, according to the wavelength identifier Wavekey of the wavelength path Path1, a low frequency signal f1 modulated at the working wavelength of the wavelength path Path1, and monitor the low frequency signal f1 to obtain the performance of the wavelength path Path1.

In this embodiment, when the performance of the wavelength path Path1 is monitored, one or more nodes in the wavelength path Path1 demodulates the wavelength signal into multiple groups of (low frequency signal+binary code). Each wavelength identifier is represented by a frequency value of the low frequency signal and a binary code representing the modulation scheme, that is, each wavelength identifier corresponds to a group of (low frequency signal+binary code).

One or more nodes in the wavelength path Path1 determine, according to the wavelength identifier Wavekey of the wavelength path Path1, a low frequency signal f1 modulated at the working wavelength of the wavelength path Path1, and monitor the low frequency signal f1 to obtain the performance of the wavelength path Path1. The nodes in the wavelength path Path1 include nodes A, D, C, and B.

Step S210 is included after step S204 and before step S209, that is, the node A determines, according to the wavelength identifier Wavekey, a low frequency signal modulated at a working wavelength $\lambda 1$ of the wavelength path Path1 and a modulation scheme, and modulates the working wavelength $\lambda 1$ of the wavelength path Path1.

In this embodiment, the node A obtains the frequency value of the low frequency signal and the binary code according to the wavelength identifier Wavekey, determines the low frequency signal f1 modulated at the working wavelength $\lambda 1$ and a modulation scheme, and performs modulation for the wavelength path Path1. For example, the binary code is 10000001, and f1 is modulated at the working wavelength $\lambda 1$ in the form of 8 levels of 10000001.

In the embodiment 1, when a wavelength path is already established, a centralized control node allocates a wavelength identifier to the wavelength path automatically; and wavelength identifier information of the wavelength path is carried in a path request message of the wavelength path. In this way, nodes in the wavelength path obtain the wavelength identifier of the wavelength path automatically and monitor the performance of the wavelength path, thereby featuring simple implementation and high reliability.

Embodiment 2: An embodiment of the present disclosure provides a method for monitoring performance of a wavelength path. On the network shown in FIG. 2, black solid lines between nodes A, B, C, D, and E indicate optical links, and a node P refers to a centralized control node. A network management system or a client notifies the node A of establishing a wavelength path Path1 between the node A and the node B to monitor the performance of the wavelength path Path1. In this case, the node A is the source node of a signaling message, and the node B is the destination node of the signaling message. The downstream refers to a direction from the source node A to the destination node B, and the upstream refers to a direction from the destination node B to the source node A. The method includes the following steps:

Step S301: The node A sends a control request message to the centralized control node P, where the control request message includes at least wavelength identifier allocation request information.

In this embodiment, to ensure that the performance of the wavelength path Path1 can be monitored, the node A sends a control request message to the centralized control node P, requesting to allocate a wavelength identifier to the wavelength path Path1, where the control request message includes at least wavelength identifier allocation request information and information of the source node A and the destination node B of the wavelength path Path1.

Step S302: The centralized control node P receives the control request message from the node A, and allocates, according to the wavelength identifier allocation request information in the control request message, a wavelength identifier Wavekey that identifies the wavelength path Path1.

The centralized control node may allocate the wavelength identifier by using the two modes in the first embodiment. The specific allocation mode may be pre-configured.

In this embodiment, the centralized control node P receives a control request message from the node A, where the control request message includes wavelength identifier allocation request information, and allocates, according to the pre-configured allocation mode 1, a wavelength identifier Wavekey that identifies the wavelength path Path1. The centralized control node P records that the wavelength identifier Wavekey is already allocated to ensure that on the network the wavelength identifier Wavekey can correspond to the wavelength path Path1 on a one-to-one basis.

Further, the centralized control node may allocate a working wavelength λ1 to the wavelength path Path1, and compute that the route of the wavelength path Path1 is A-D-C-B according to the information of the source node and destination node of the wavelength path Path1; or the source node A, a PCE (Path Computation Element, path computation element), or the network management system may compute that the route of the wavelength path Path1 is A-D-C-B and allocate the working wavelength λ1 of the wavelength path Path1.

Step S303: The centralized control node P sends a control reply message to the node A, where the control reply message includes at least first wavelength identifier information WK1 constructed according to the wavelength identifier Wavekey.

In this embodiment, the centralized control node P constructs, by using the wavelength identifier Wavekey, the first wavelength identifier information WK1 according to the format of the control reply message, and sends the control reply message to the node A, where the control reply message includes at least the first wavelength identifier information WK1 constructed according to the wavelength identifier Wavekey.

The control reply message may further include the working wavelength λ1 of the wavelength path Path1 and the route A-D-C-B of the wavelength path Path1.

Step S304: The node A receives the control reply message from the centralized control node P, obtains the wavelength identifier Wavekey according to the first wavelength identifier information WK1 in the control reply message, and records the mapping relationship between the wavelength path Path1 and the wavelength identifier Wavekey.

Step S305: The node A sends a path request message of the wavelength path Path1 to the downstream neighboring node D, where the path request message includes at least the path identifier of the wavelength path Path1 and second wavelength identifier information WK2 constructed according to the wavelength identifier Wavekey.

In this embodiment, the node A sends, according to the second wavelength identifier information WK2 constructed according to the wavelength identifier Wavekey, a path request message of the wavelength path Path1 to the node D, where the path request message includes at least the Path ID of the wavelength path Path1 and the second wavelength identifier information WK2 constructed according to the wavelength identifier Wavekey, and may further include explicit route information D-C-B.

Step S306: The node D receives the path request message, obtains the wavelength identifier Wavekey according to the second wavelength identifier information WK2 in the path request message, and records the mapping relationship between the wavelength path Path1 and the wavelength identifier Wavekey; and sends a path request message of the wavelength path Path1 to the downstream neighboring node C, where the path request message includes at least the path identifier of the wavelength path Path1 and the second wavelength identifier information WK2.

In this embodiment, the step of "sending a path request message of the wavelength path Path1 to the downstream neighboring node C" may be executed before or after the step of "obtaining the wavelength identifier Wavekey according to the wavelength identifier information in the path request message and recording the mapping relationship between the wavelength path Path1 and the wavelength identifier Wavekey", and both the steps are executed after the step of "receiving the path request message."

Step S307: The node C receives the path request message, obtains the wavelength identifier Wavekey according to the second wavelength identifier information WK2 in the path request message, and records the mapping relationship between the wavelength path Path1 and the wavelength identifier Wavekey; and sends a path request message of the wavelength path Path1 to the downstream neighboring node B, where the path request message includes at least the path identifier of the wavelength path Path1 and the second wavelength identifier information WK2.

In this embodiment, the step of "sending a path request message of the wavelength path Path1 to the downstream neighboring node B" may be executed before or after the step of "obtaining the wavelength identifier Wavekey according to the wavelength identifier information in the path request message and recording the mapping relationship between the wavelength path Path1 and the wavelength identifier Wavekey," and both the steps are executed after the step of "receiving the path request message."

Step S308: The node B receives the path request message and confirms that the wavelength path Path1 is established; and obtains the wavelength identifier Wavekey according to the second wavelength identifier information WK2 in the path request message, and records the mapping relationship between the wavelength path Path1 and the wavelength identifier Wavekey.

Step S309: One or more nodes in the wavelength path Path1 determine, according to the wavelength identifier Wavekey of the wavelength path Path1, a low frequency signal f1 modulated at the working wavelength of the wavelength path Path1, and monitor the low frequency signal f1 to obtain the performance of the wavelength path Path1.

Step S310 is included after step S304 and before step S309, that is, the node A determines, according to the wavelength identifier Wavekey, a low frequency signal modulated at the working wavelength λ1 of the wavelength path Path1 and a modulation scheme, and modulates the working wavelength λ1 of the wavelength path Path1.

In this embodiment, the node A obtains the frequency value of the low frequency signal and the binary code according to the wavelength identifier Wavekey, determines the low frequency signal f1 modulated at the working wavelength λ1 and the modulation scheme, and performs corresponding modulation for the wavelength path Path1.

Embodiment 3: An embodiment of the present disclosure provides a method for monitoring performance of a wavelength path. On the network shown in FIG. 2, black solid lines between nodes A, B, C, D, and E indicate optical links, and node P refers to a centralized control node. A network management system or a client notifies the node A of establishing a wavelength path Path1 between the node A and the node B to monitor the performance of the wavelength path Path1. In this case, the node A is the source node of a signaling message, and the node B is the destination node of the signaling message. The downstream refers to a direction from the source node A to the destination node B, and the upstream refers to a direction from the destination node B to the source node A. The method includes the following steps:

In this embodiment, step S401 to step S407 are similar to step S301 to step S307 in the second embodiment, and are not further described herein.

Step S408: The node B receives a path request message, and sends a path reply message to the upstream neighboring node C; and obtains the wavelength identifier Wavekey according to the second wavelength identifier information WK2 in the path request message, and records the mapping relationship between the wavelength path Path1 and the wavelength identifier Wavekey.

In this embodiment, the step of "sending a path reply message to the upstream neighboring node C" may be executed before or after the step of "obtaining the wavelength identifier Wavekey according to the wavelength identifier information in the path request message and recording the mapping relationship between the wavelength path Path1 and the wavelength identifier Wavekey", and both the steps are executed after the step of "receiving a path request message."

Step S409: The node C receives a path request message, and sends a path reply message to the upstream neighboring node D.

Step S410: The node D receives a path request message, and sends a path reply message to the upstream neighboring node A.

Step S411: The node A receives a path reply message, and confirms that the wavelength path Path1 is established.

Step S412: One or more nodes in the wavelength path Path1 determine, according to the wavelength identifier Wavekey of the wavelength path Path1, a low frequency signal f1 modulated at a working wavelength of the wavelength path Path1, and monitor the low frequency signal f1 to obtain the performance of the wavelength path Path1.

Step S413 is included after step S404 and before step S412, that is, the node A determines, according to the wavelength identifier Wavekey, a low frequency signal modulated at a working wavelength λ1 of the wavelength path Path1 and a modulation scheme, and modulates the working wavelength λ1 of the wavelength path Path1.

In the embodiment 2 and the embodiment 3, when a wavelength path is not established, a centralized control node allocates a wavelength identifier to the wavelength path automatically; and wavelength identifier information of the wavelength path is carried in a path request message of the wavelength path in the process of establishing the wavelength path. In this way, nodes in the wavelength path obtain the wavelength identifier of the wavelength path automatically and monitor the performance of the wavelength path, thereby featuring simple implementation and high reliability.

In the above embodiment, if the wavelength path Path1 fails to be established or is deleted after the wavelength path Path1 is established, each node in the wavelength path Path1 deletes the mapping relationship between the wavelength path Path1 and the wavelength identifier Wavekey. The node A sends a control request message to the centralized control node P, where the control request message carries wavelength identifier deletion request information; the centralized control node P receives the control request message from the node A, releases the allocated wavelength identifier Wavekey, and records that the wavelength identifier Wavekey is not allocated. The released wavelength identifier Wavekey may be allocated to other wavelength paths.

In the above embodiment, the first wavelength identifier information and the second wavelength identifier information are constructed according to the wavelength identifier, and are carried in the control reply message and the path request message respectively. The first wavelength identifier information and the second wavelength identifier information may be the same or different, depending on the formats of the control reply message and the path request message.

In the above embodiment, the route of the wavelength path may include only the source node and the destination node and include no intermediate nodes, or may include the source node, the destination node, and one or more intermediate nodes. The above embodiment describes a scenario where the route of the wavelength path includes two intermediate nodes, that is, the route includes the source node A, the destination node B, the intermediate node D, and the intermediate node C. In scenarios where one or more intermediate nodes exist between the source node and the destination node, the processing of each intermediate node is similar to the processing of intermediate nodes provided in this embodiment, and is not further described herein.

In the above embodiment, the centralized control node may be a PCE.

Figure 4B:
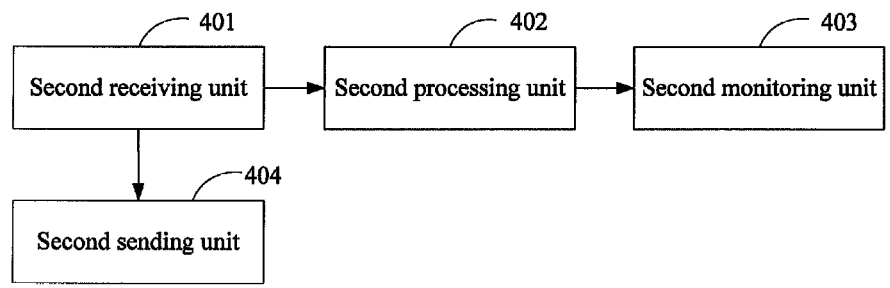
FIG. 4b is a structural block diagram of another node device according to an embodiment of the present disclosure.

Embodiment 4: An embodiment of the present disclosure provides a node device. As shown in FIG. 4, the node device includes:

a second receiving unit 401, configured to receive a path request message of a wavelength path from an upstream neighboring node, where the path request message includes at least a path identifier of the wavelength path and second wavelength identifier information, where:

the second wavelength identifier information is information constructed according to a wavelength identifier and included in the path request message of the wavelength path sent to a downstream neighboring node by a first node device after recording a mapping relationship between the wavelength path and the wavelength identifier; the wavelength identifier is obtained by the first node device according to first wavelength identifier information in a control reply message sent from a centralized control node; the wavelength identifier is indicated by a frequency value of a low frequency signal and a binary code representing a modulation scheme and is used by the first node device to determine the low frequency signal modulated at a working wavelength of the wavelength path and the modulation scheme and modulate the working wavelength of the wavelength path; the first wavelength identifier information is information constructed according to the wavelength identifier and included in the control reply message sent to the first node device by the centralized control node after allocating, according to wavelength identifier allocation request information, the wavelength identifier that identifies the wavelength path; and the wavelength identifier allocation request information is carried in a control request message received by the centralized control node from the first node device;

a second processing unit 402, configured to obtain the wavelength identifier according to the second wavelength identifier information, and record the mapping relationship between the wavelength path and the wavelength identifier; and a second monitoring unit 403, configured to determine, according to the wavelength identifier, the low frequency signal modulated at the working wavelength of the wavelength path, and monitor the low frequency signal to obtain the performance of the wavelength path.

Further, the node device may include:

a second sending unit 404, configured to: send a path request message of the wavelength path to a downstream neighboring node device after the second receiving unit 401 receives the path request message of the wavelength path from the upstream neighboring node device, where the path request message includes at least the path identifier of the wavelength path and the second wavelength identifier information, where the second wavelength identifier information is used by the downstream neighboring node device to obtain the wavelength identifier, record the mapping relationship between the wavelength path and the wavelength identifier, determine, according to the wavelength identifier, the low frequency signal modulated at the working wavelength of the wavelength path, and obtain the performance of the wavelength path by monitoring the low frequency signal.

Figure 5A:
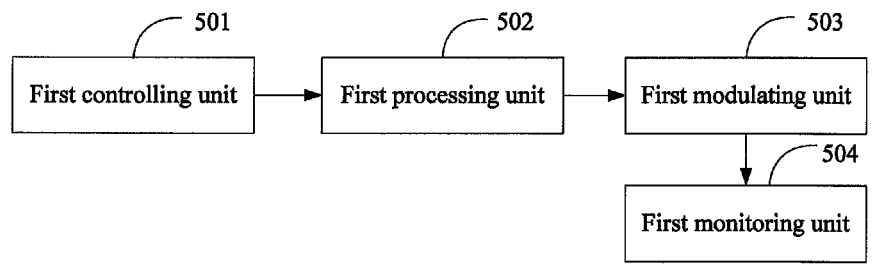
FIG. 5a is a structural block diagram of still another node device according to an embodiment of the present disclosure.
Figure 5B:
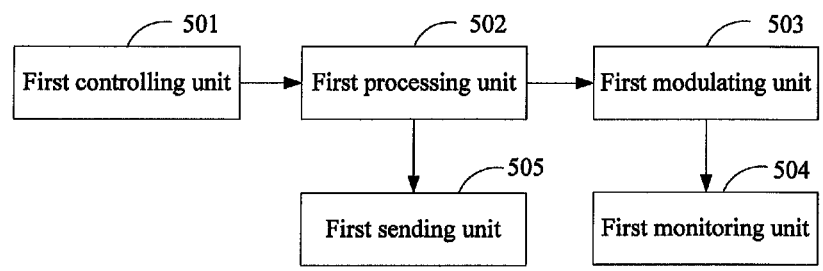
FIG. 5b is a structural block diagram of still another node device according to an embodiment of the present disclosure.

Embodiment 5: An embodiment of the present disclosure provides a node device. As shown in FIG. 5, the node device includes:

a first controlling unit 501, configured to: send a control request message to a centralized control node device, where the control request message includes at least wavelength identifier allocation request information; and receive a control reply message sent from the centralized control node device, where the control reply message includes at least first wavelength identifier information constructed according to a wavelength identifier, where the wavelength identifier is indicated by a frequency value of a low frequency signal and a binary code representing a modulation scheme and is allocated by the centralized control node device according to the wavelength identifier allocation request information in the received control request message and is used to identify a wavelength path;

a first processing unit 502, configured to obtain the wavelength identifier according to the first wavelength identifier information, and record the mapping relationship between the wavelength path and the wavelength identifier;

a first modulating unit 503, configured to determine, according to the wavelength identifier, the low frequency signal modulated at a working wavelength of the wavelength path and the modulation scheme, and modulate the working wavelength of the wavelength path; and a first monitoring unit 504, configured to monitor the low frequency signal to obtain performance of the wavelength path.

Further, the node device may include:

a first sending unit 505, configured to: after the first processing unit 502 records the mapping relationship between the wavelength path and the wavelength identifier, send a path request message of the wavelength path to a downstream neighboring node device, where the path request message includes at least a path identifier of the wavelength path and second wavelength identifier information constructed according to the wavelength identifier, where the second wavelength identifier information is used by the downstream neighboring node device to obtain the wavelength identifier, record the mapping relationship between the wavelength path and the wavelength identifier, determine, according to the wavelength identifier, the low frequency signal modulated at the working wavelength of the wavelength path and the modulation scheme, and obtain the performance of the wavelength path by monitoring the low frequency signal.

The information interaction between the units and execution procedures in the node devices provided in the above embodiment 4 and embodiment 5 are based on the same idea as the method in embodiments of the present disclosure. Therefore, reference may be made to the method provided in embodiments of the present disclosure, and no repeated description is provided herein.

By using the node device provided in the embodiments of the present disclosure, a wavelength identifier can be obtained automatically. In this way, a low frequency signal corresponding to the wavelength path is determined according to the wavelength identifier, and the low frequency signal is monitored to obtain the performance of the wavelength path, thereby featuring simple implementation and high reliability.

Figure 6:
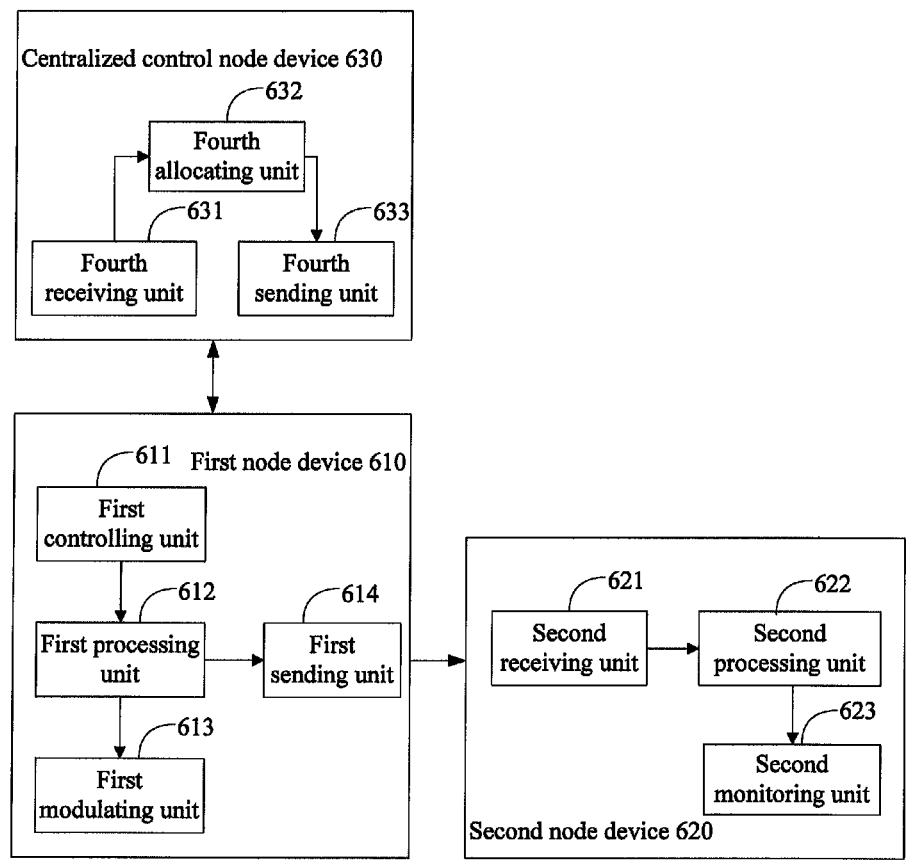
FIG. 6 is a schematic diagram of a system for monitoring performance of a wavelength path according to an embodiment of the present disclosure.

Embodiment 6: An embodiment of the present disclosure provides a system for monitoring performance of a wavelength path. As shown in FIG. 6, the system includes at least a first node device 610, a second node device 620, and a centralized control node device 630.

The first node device 610 includes a first controlling unit 611, a first processing unit 612, a first modulating unit 613, and a first sending unit 614.

The first controlling unit 611 is configured to: send a control request message to the centralized control node device 630, where the control request message includes at least wavelength identifier allocation request information; receive a control reply message from the centralized control node device 630, where the control reply message includes at least first wavelength identifier information corresponding to a wavelength identifier.

The first processing unit 612 is configured to obtain the wavelength identifier according to the first wavelength identifier information in the control reply message, and record the mapping relationship between the wavelength path and the wavelength identifier.

The first modulating unit 613 is configured to determine, according to the wavelength identifier, a low frequency signal modulated at a working wavelength of the wavelength path and a modulation scheme, and modulate the working wavelength of the wavelength path.

The first sending unit 614 is configured to: after the first processing unit 612 records the mapping relationship between the wavelength path and the wavelength identifier, send a path request message of the wavelength path to a downstream neighboring node, where the path request message includes at least a path identifier of the wavelength path and second wavelength identifier information constructed according to the wavelength identifier.

The centralized control node device 630 includes a fourth receiving unit 631, a fourth allocating unit 632, and a fourth sending unit 633.

The fourth receiving unit 631 is configured to receive a control request message, where the control request message includes at least wavelength identifier allocation request information.

The fourth allocating unit 632 is configured to allocate, according to the wavelength identifier allocation request information in the control request message, a wavelength identifier that identifies the wavelength path, where the wavelength identifier is indicated by a frequency value of the low frequency signal and a binary code representing the modulation scheme.

The fourth sending unit 633 is configured to send a control reply message to the first node device 610, where the control reply message includes at least first wavelength identifier information constructed according to the wavelength identifier.

The second node device 620 includes a second receiving unit 621, a second processing unit 622, and a second monitoring unit 623.

The second receiving unit 621 is configured to receive a path request message of a wavelength path from an upstream neighboring node, where the path request message includes at least a path identifier of the wavelength path and second wavelength identifier information.

The second processing unit 622 is configured to obtain a wavelength identifier according to the second wavelength identifier information, and record the mapping relationship between the wavelength path and the wavelength identifier.

The second monitoring unit 623 is configured to determine, according to the wavelength identifier, a low frequency signal modulated at a working wavelength of the wavelength path, and monitor the low frequency signal to obtain the performance of the wavelength path.

Further, the system may include a third node device 630 and a second sending unit 624 of the second node device 620.

The third node device 630 includes a third receiving unit 631, a third processing unit 632, and a third monitoring unit 633.

The third receiving unit 631 is configured to receive a path request message of the wavelength path from an upstream neighboring node, where the path request message includes at least the path identifier of the wavelength path and the second wavelength identifier information.

The third processing unit 632 is configured to obtain the wavelength identifier according to the second wavelength identifier information, and record the mapping relationship between the wavelength path and the wavelength identifier.

The third monitoring unit 633 is configured to determine, according to the wavelength identifier, the low frequency signal modulated at the working wavelength of the wavelength path, and monitor the low frequency signal to obtain the performance of the wavelength path.

The second node device 620 further includes a second sending unit 624 configured to: after the second receiving unit 621 receives the path request message of the wavelength path from the upstream neighboring node device, send a path request message of the wavelength path to a downstream neighboring node device, where the path request message includes at least the path identifier of the wavelength path and the second wavelength identifier information.

Figure 7:
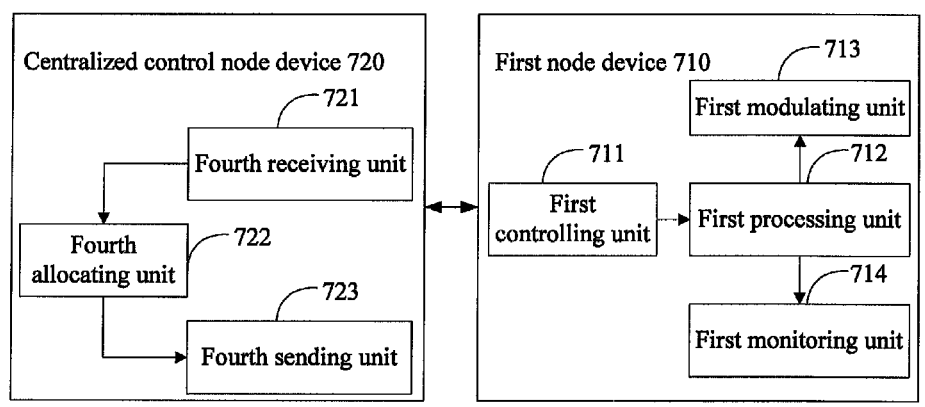
FIG. 7 is a schematic diagram of another system for monitoring performance of a wavelength path according to an embodiment of the present disclosure.

Embodiment 7: An embodiment of the present disclosure provides a system for monitoring performance of a wavelength path. As shown in FIG. 7, the system includes at least a first node device 710 and a centralized control node device 720.

The first node device 710 includes a first controlling unit 711, a first processing unit 712, a first modulating unit 713, and a first monitoring unit 714.

The first controlling unit 711 is configured to: send a control request message to the centralized control node device 720, where the control request message includes at least wavelength identifier allocation request information; receive a control reply message from the centralized control node device 720, where the control reply message includes at least first wavelength identifier information corresponding to a wavelength identifier.

The first processing unit 712 is configured to obtain the wavelength identifier according to the first wavelength identifier information in the control reply message, and record the mapping relationship between the wavelength path and the wavelength identifier.

The first modulating unit 713 is configured to determine, according to the wavelength identifier, a low frequency signal modulated at a working wavelength of the wavelength path and a modulation scheme, and modulate the working wavelength of the wavelength path.

The first monitoring unit 714 is configured to monitor the low frequency signal to obtain performance of the wavelength path.

The centralized control node device 720 includes a fourth receiving unit 721, a fourth allocating unit 722, and a fourth sending unit 723.

The fourth receiving unit 721 is configured to receive a control request message, where the control request message includes at least the wavelength identifier allocation request information.

The fourth allocating unit 722 is configured to allocate, according to the wavelength identifier allocation request information in the control request message, the wavelength identifier that identifies the wavelength path, where the wavelength identifier is indicated by a frequency value of the low frequency signal and a binary code representing the modulation scheme.

The fourth sending unit 723 is configured to send a control reply message to the first node device 710, where the control reply message includes at least first wavelength identifier information constructed according to the wavelength identifier.

Further, the system may include a second node device 730 and a first sending unit 715 of the first node device 710.

The second node device 730 includes a second receiving unit 731, a second processing unit 732, and a second monitoring unit 733.

The second receiving unit 731 is configured to receive a path request message of a wavelength path from an upstream neighboring node, where the path request message includes at least the path identifier of the wavelength path and the second wavelength identifier information.

The second processing unit 732 is configured to obtain the wavelength identifier according to the second wavelength identifier information, and record the mapping relationship between the wavelength path and the wavelength identifier.

The second monitoring unit 733 is configured to determine, according to the wavelength identifier, the low frequency signal modulated at the working wavelength of the wavelength path, and monitor the low frequency signal to obtain the performance of the wavelength path.

Further, the first node device 710 includes a first sending unit 715 configured to: after recording the mapping relationship between the wavelength path and the wavelength identifier, send a path request message of the wavelength path to a downstream neighboring node, where the path request message includes at least the path identifier of the wavelength path and the second wavelength identifier information constructed according to the wavelength identifier.

In the system for monitoring performance of a wavelength path according to the above sixth embodiment and seventh embodiment of the present disclosure, specific implementation processes of each unit and information interaction between each unit are based on the same idea as the method in the embodiments of the present disclosure. Reference may be made to the method provided in the embodiments of the present disclosure, and details are omitted herein.

The PCECP (Path Computation Element Communication Protocol, Path Computation Element Communication Protocol) may be extended to carry the wavelength identifier allocation request information, the wavelength identifier deletion request information, and the wavelength identifier information in the control request message and the control reply message in the above embodiments.

The PCReq Message (Path Computation Request Message, Path Computation Request Message) of the PCECP protocol may be used as the control request message, and the PCRep Message (Path Computation Reply Message, Path Computation Reply Message) of the PCECP protocol may be used as the control reply message.

The wavelength identifier allocation request information may be carried by extending the existing PCReq message of the PCECP protocol. A wavelength identifier allocation request object (Wavekey flag object) is added to the PCReq message to carry the wavelength identifier allocation request information.

The wavelength identifier deletion request information may be carried by extending the existing Notification message of the PCECP protocol. A wavelength identifier deletion request object (Wavekey de-flag object) is added to the Notification message to carry the wavelength identifier deletion request information.

The wavelength identifier information may be carried by extending the existing PCRep message of the PCECP protocol. A wavelength identifier object (Wavekey object) is added to the PCRep message to carry the wavelength identifier information. The encapsulation format of the payload of the wavelength identifier object is shown in FIG. 3a. The wavelength identifier information is represented by 32 bits and includes two fields: frequency information and binary code information. As shown in FIG. 3b, each field is defined as follows:

The frequency information indicates the frequency value of a low frequency signal modulated at the working wavelength.

The binary code information indicates a binary code value corresponding to the modulation scheme.

The RSVP-TE (Resource Reservation Protocol with TE, Resource Reservation Protocol with TE) of the GMPLS (Generalized Multiprotocol Label Switching, Generalized Multiprotocol Label Switching) may be extended to carry the wavelength identifier information in the path request message and the path reply message in the above embodiments.

The Path message may be used as the path request message, and the Resv message may be used as the path reply message.

The wavelength identifier information may be carried by extending an existing label explicit route subobject (Label ERO subobject) of the Path message. A 32-bit field is added to the Label ERO subobject to carry the wavelength identifier information, as shown in FIG. 3a. The wavelength identifier information is represented by 32 bits and includes two fields: frequency information and binary code information. As shown in FIG. 3b, each field is defined as follows:

The frequency information indicates the frequency value of a low frequency signal modulated at the working wavelength.

The binary code information indicates a binary code value corresponding to the modulation scheme.

By using the technical solutions provided in the embodiments of the present disclosure, a centralized control node allocates a wavelength identifier to a wavelength path automatically; and wavelength identifier information of the wavelength path is carried in a path request message of the wavelength path. In this way, nodes in the wavelength path obtain the wavelength identifier of the wavelength path automatically and monitor the performance of the wavelength path, thereby featuring simple implementation and high reliability.

Persons of ordinary skill in the art should understand that all or a part of the steps of the methods in the embodiments may be implemented by a computer program instructing relevant hardware such as a hardware processor. The program may be stored in a computer readable storage medium accessible to the hardware processor. When the program runs, the processes of the methods in the embodiments are performed. The storage medium may be a magnetic disk, an optical disk, a Read-Only Memory (Read-Only Memory, ROM), a Random Access Memory (Random Access Memory, RAM), and the like.

The foregoing descriptions are merely exemplary embodiments of the present disclosure, but not intended to limit the protection scope of the present disclosure. Any variation or replacement made by persons skilled in the art without departing from the technical scope of the present disclosure shall fall within the protection scope of the present disclosure. Hence the protection scope of the present disclosure shall be subject to the appended claims.

What is claimed is:

1. A method for monitoring performance of a wavelength path, comprising:
   receiving, by an intermediate node, a first path request message of a wavelength path from an upstream neighboring node, wherein the first path request message comprises at least a path identifier of the wavelength path and wavelength identifier information;
   obtaining, by the intermediate node, a wavelength identifier according to the wavelength identifier information, and recording a mapping relationship between the wavelength path and the wavelength identifier; and
   determining, by the intermediate node according to the wavelength identifier, a low frequency signal modulated at a working wavelength of the wavelength path, and obtaining performance of the wavelength path by monitoring the low frequency signal; wherein:
   the wavelength identifier is allocated to the wavelength path by a centralized control node, and the wavelength identifier is indicated by a frequency value of the low frequency signal and a binary code representing a modulation scheme.

2. The method according to claim 1, further comprising: after receiving the first path request message of the wavelength path from the upstream neighboring node, sending, by the intermediate node, a second path request message of the wavelength path to a downstream neighboring node, wherein the second path request message comprises at least the path identifier of the wavelength path and the wavelength identifier information.

3. A method for monitoring performance of a wavelength path, comprising:
   sending, by a first node, a control request message to a centralized control node, wherein the control request message comprises at least wavelength identifier allocation request information;
   receiving, by the first node, a control reply message from the centralized control node, wherein the control reply message comprises at least first wavelength identifier information constructed according to a wavelength identifier, wherein the wavelength identifier is indicated by a frequency value of a low frequency signal and a binary code representing a modulation scheme and is allocated by the centralized control node according to the wavelength identifier allocation request information in the received control request message and is used to identify a wavelength path;

obtaining, by the first node, the wavelength identifier according to the first wavelength identifier information, and recording a mapping relationship between the wavelength path and the wavelength identifier;

determining, by the first node according to the wavelength identifier, the low frequency signal modulated at a working wavelength of the wavelength path and the modulation scheme, and modulating the working wavelength of the wavelength path; and monitoring, by the first node, the low frequency signal to obtain performance of the wavelength path.

4. A node device, comprising a hardware processor and a non-transitory storage medium configured to store instructions for operating a receiving unit, a processing unit, and a monitoring unit, wherein the instructions, when executed the hardware processor, cause:

the receiving unit to receive a path request message of a wavelength path from an upstream neighboring node, wherein a path request message comprises at least a path identifier of the wavelength path and-wavelength identifier information, wherein the wavelength identifier is allocated to the wavelength path by a centralized control node, and the wavelength identifier is indicated a frequency value of a low frequency signal and a binary code representing a modulation scheme;

the processing unit to obtain the wavelength identifier according to the wavelength identifier information, and record a mapping relationship between the wavelength path and the wavelength identifier; and the monitoring unit to determine, according to the wavelength identifier, the low frequency signal modulated at a working wavelength of the wavelength path, and obtain performance of the wavelength path by monitoring the low frequency signal.

5. A node device, comprising a hardware processor and a non-transitory storage medium configured to store instructions for operating a first controlling unit, a first processing unit, a first modulating unit, and a first monitoring unit, wherein the instructions, when executed by the hardware processor, cause:

the first controlling unit to: send a control request message to a centralized control node device, wherein the control request message comprises at least wavelength identifier allocation request information; and receive a control reply message sent from the centralized control node device, wherein the control reply message comprises at least first wavelength identifier information constructed according to a wavelength identifier, wherein the wavelength identifier is indicated by a frequency value of a low frequency signal and a binary code representing a modulation scheme and is allocated by the centralized control node device according to the wavelength identifier allocation request information in the received control request message and is used to identify a wavelength path;

the first processing unit to obtain the wavelength identifier according to the first wavelength identifier information, and record a mapping relationship between the wavelength path and the wavelength identifier;

the first modulating unit to determine, according to the wavelength identifier, the low frequency signal modulated at a working wavelength of the wavelength path and the modulation scheme, and modulate the working wavelength of the wavelength path; and the first monitoring unit to monitor the low frequency signal to obtain performance of the wavelength path.

* * * * *